No. 709,359. Patented Sept. 16, 1902.
S. A. RHODES.
OPTICAL INSTRUMENT.
(Application filed Mar. 13, 1902.)
(No Model.) 4 Sheets—Sheet 1.
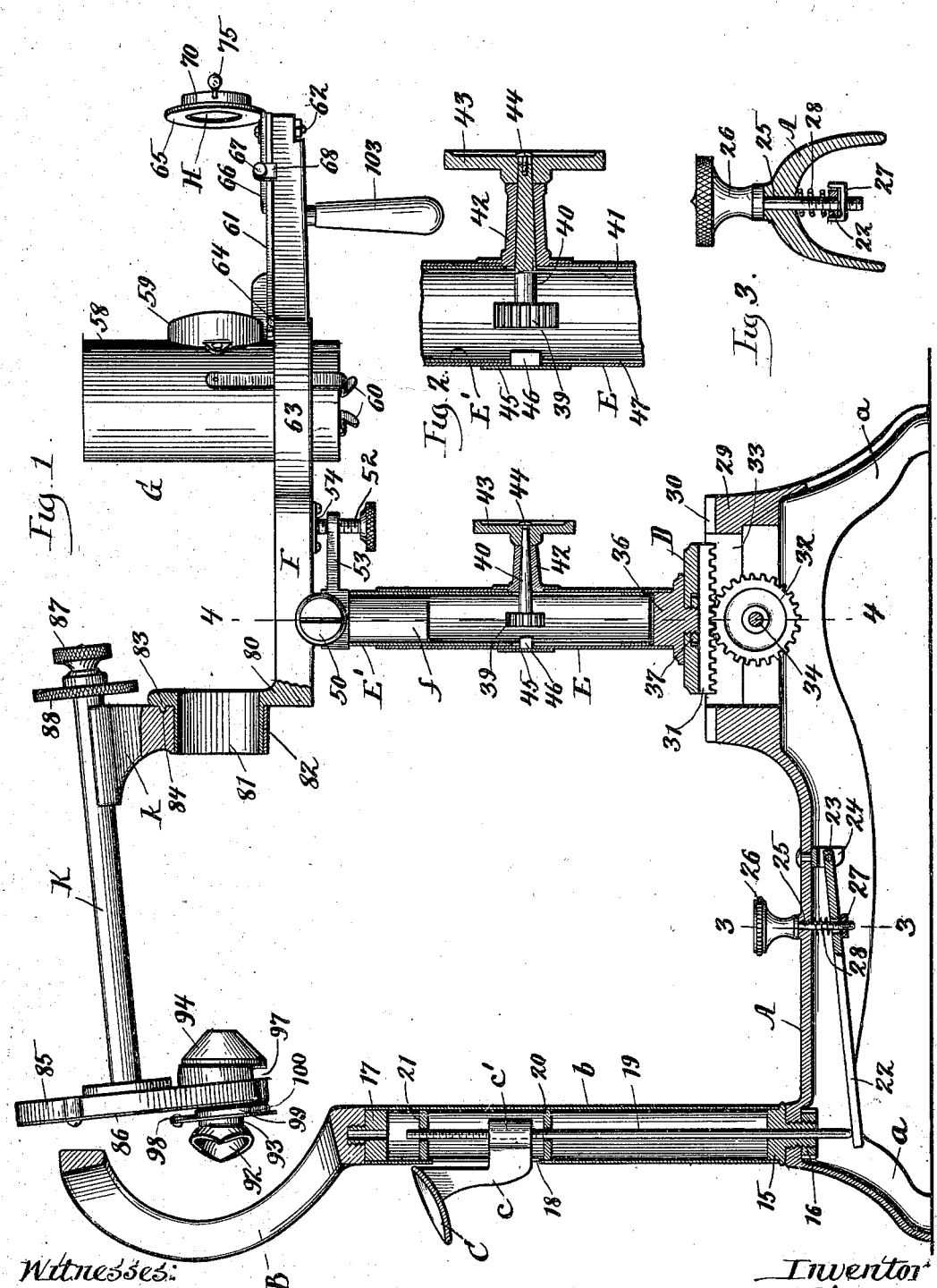
Witnesses:
Fred Gulack
Porris H. Alfords
Inventor
Seth A. Rhodes
By Peirce & Fisher
his Attorneys.
THE NORRIS PETERS CO., PHOTO-LITHO., WASHINGTON, D. C.

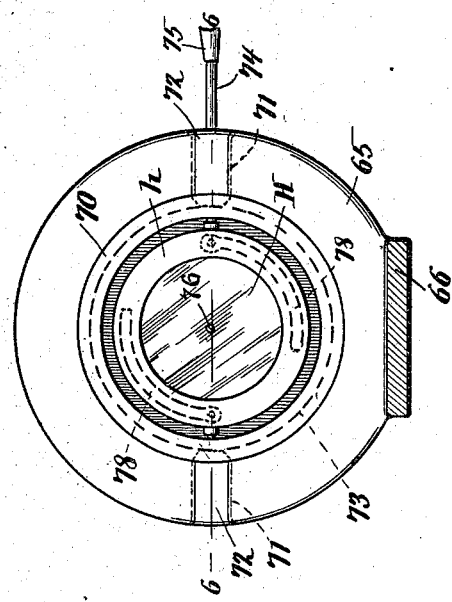

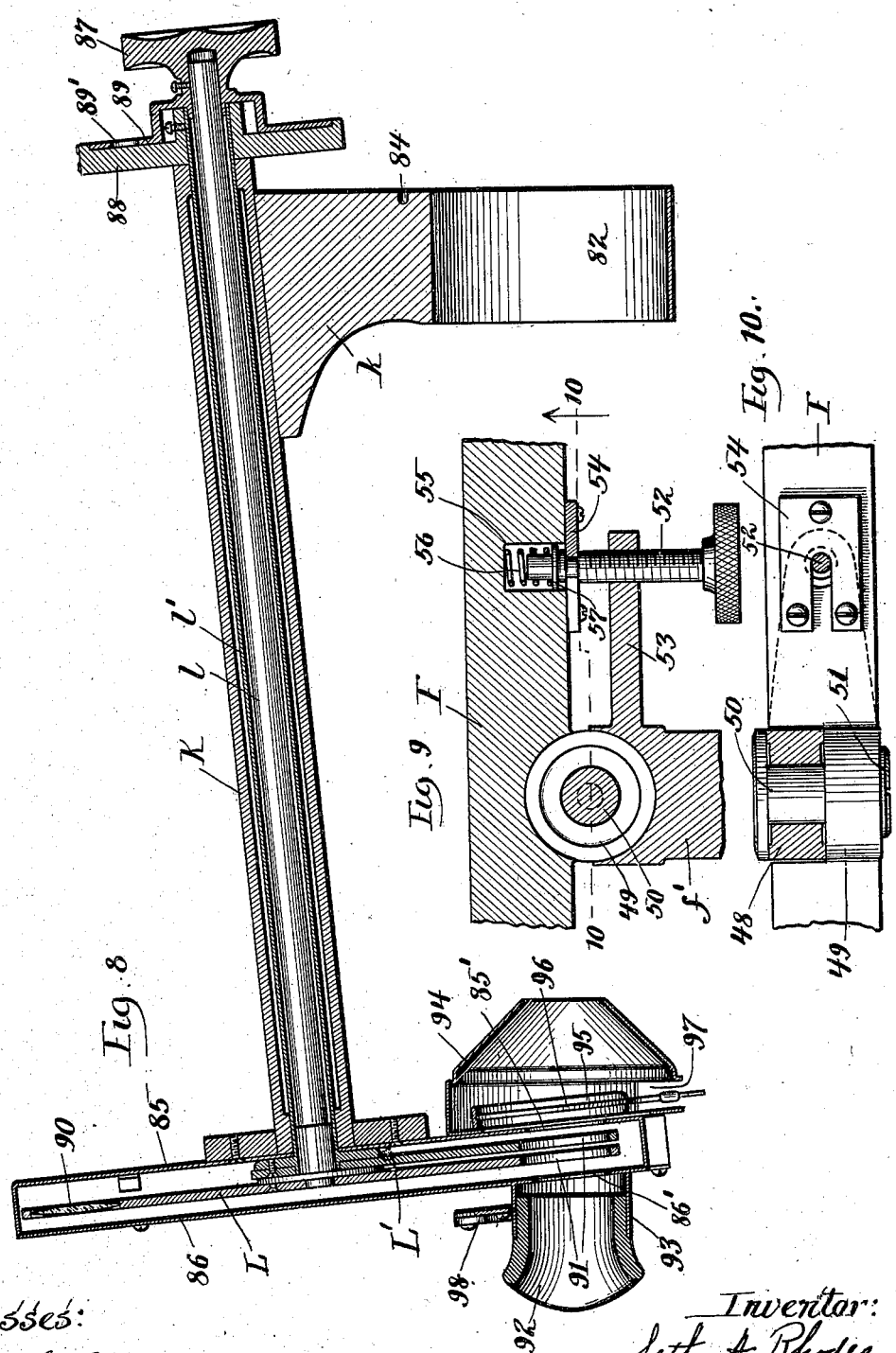

No. 709,359. Patented Sept. 16, 1902.
S. A. RHODES.
OPTICAL INSTRUMENT.
(Application filed Mar. 13, 1902.)
(No Model.) 4 Sheets—Sheet 4.
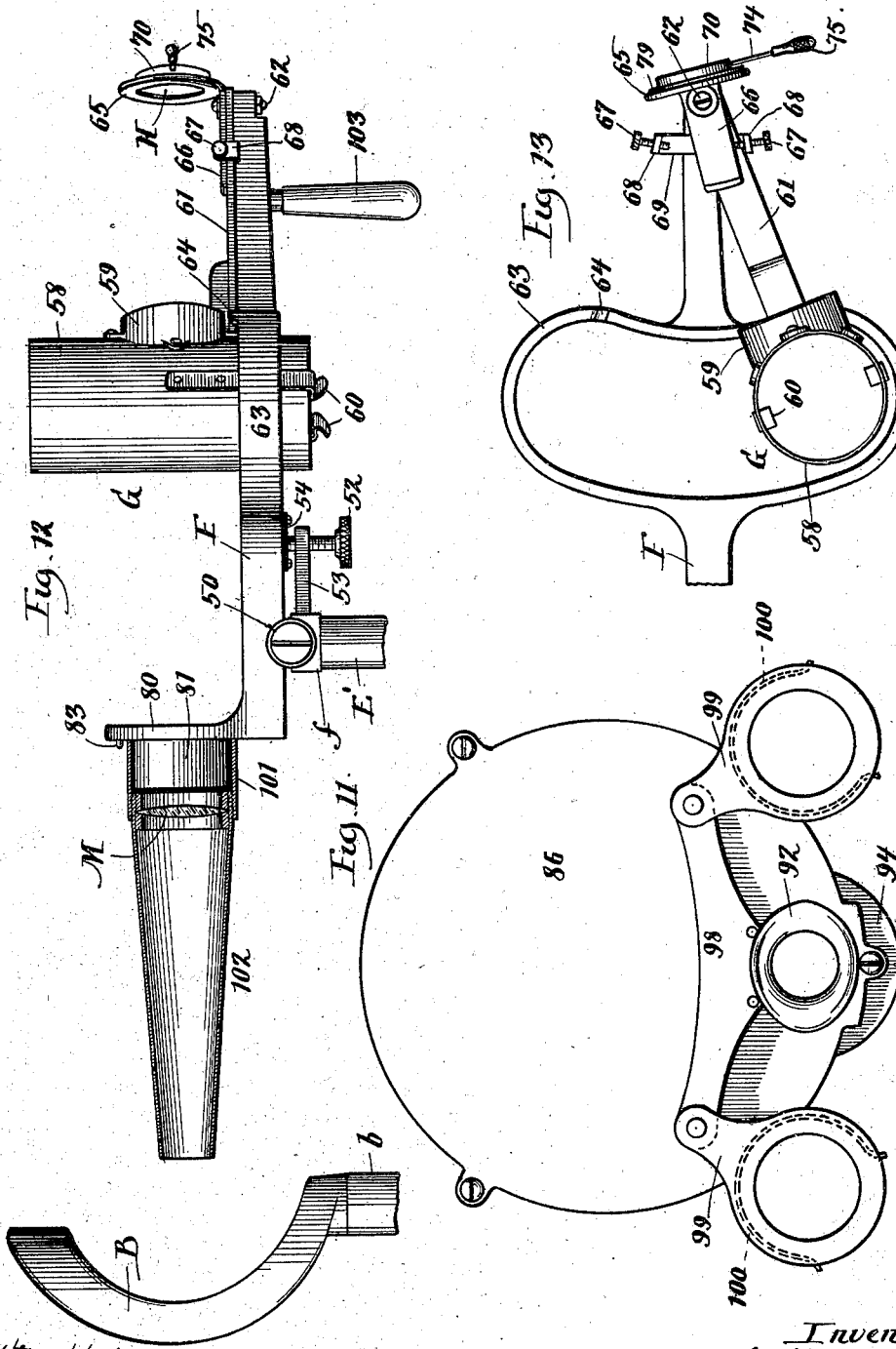
Witnesses:
Inventor
Seth A. Rhodes
By Peirce + Fisher
Attorneys

UNITED STATES PATENT OFFICE.

SETH A. RHODES, OF CHICAGO, ILLINOIS.

OPTICAL INSTRUMENT.

SPECIFICATION forming part of Letters Patent No. 709,359, dated September 16, 1902.

Application filed March 13, 1902. Serial No. 97,998. (No model.)

*To all whom it may concern:*

Be it known that I, SETH A. RHODES, a citizen of the United States, and a resident of Chicago, Cook county, and State of Illinois, have invented certain new and useful Improvements in Optical Instruments, of which the following is declared to be a full, clear, and exact description.

The improvement relates to that class of instruments used by oculists and others for objective tests of the eyes of a patient, and seeks to provide an instrument adapted for use either as a retinoscope for testing the refractive errors or as an ophthalmoscope for testing the pathological condition of the eye. The retinoscope and ophthalmoscope generally employed at the present time are plane or spherical mirrors having a central peephole and are held in the hand of the operator before his own eye and in proper position to reflect a ray of light from a light-screen to the eye of a patient, while suitable lenses are placed before the eye being examined or held in the operator's hand in line between the patient's eye and the mirror. Such instruments must be used in a dark room. Great skill is required to obtain accurate results, and the time required for a test and inconvenience both to the patient and operator are considerable.

The present invention provides an instrument adapted at one end to position the patient's head and having a light-screen and apertured mirror mounted in proper relative position at the operator's end, separate suitable devices or lens-carriers, which may be removably or otherwise interchangeably positioned between the operator's mirror and patient's eye for retinoscopic or ophthalmoscopic test, so that in either case accurate results may be quickly attained with little inconvenience to the patient or operator and without necessitating resort to a dark room.

The invention consists in the features, arrangements, and combinations of parts set forth in the following description, illustrated in the accompanying drawings, and more particularly pointed out in the appended claims.

In the drawings, in which like parts bear like designation throughout, Figure 1 is a view in elevation, partially in section, of the improved instrument with the retinoscopic attachment or lens-carrier in position. Fig. 2 is an enlarged detail view of an adjustment shown in Fig. 1. Fig. 3 is an enlarged detail section on line 3 3 of Fig. 1. Fig. 4 is a detail section on line 4 4 of Fig. 1. Fig. 5 is a detail elevation of the mirror and its support. Fig. 6 is a section of the same on line 6 6 of Fig. 5. Fig. 7 is a detail end view of the retinoscopic attachment or lens-holder, showing the scales. Fig. 8 is a longitudinal section of the retinoscopic attachment. Fig. 9 is a vertical detail section of one of the adjustable frame-joints. Fig. 10 is a section on line 10 10 of Fig. 9. Fig. 11 is a view of the outer or patient's end of the retinoscopic lens-holder. Fig. 12 is an elevation, partially in section, of the upper part of the instrument with the ophthalmoscopic attachment in place. Fig. 13 is a detail plan view of the operator's end of the instrument, showing the light-screen and mirror-support.

The instrument is mounted upon a suitable base A, preferably of general inverted-U shape in section, as shown in Fig. 3, and having end supports or legs $a$.

At the outer end of the instrument, which is adapted for the patient, is provided a tubular standard $b$, having brazed or soldered within its lower end a plug 15, which extends through an opening in base A and is threaded securely into a nut 16 to hold standard $b$ in place. Upon a similar plug 17 in the upper end of standard $b$ is threaded a patient's head-rest, comprising an open oval frame B, extending laterally at either side to fit against the forehead and sides of the face of the patient, who may thus be conveniently placed in position for the examination of the eyes.

For further convenience of the patient an angular-shaped plate or support $c$ projects through a vertical slot 18, cut in the rear face of standard $b$, and carries a chin-rest C. A supporting-rod 19 for the chin-rest slides vertically through openings in end plugs 15 and 17 and in the horizontal guide-plates 20 and 21 within standard $b$, and the upper end of the rod is threaded through an eye $c'$, formed on the inner end of support $c$. Rod 19, extending below the end of standard $b$ and within the base A, loosely engages the free end of an adjusting-arm 22, which is mounted to swing within the base portion upon a pivot 23, which connects the inner end of arm 22 and a yoke 24, riveted or otherwise fixed to the base portion. An adjusting-screw 25 extends through an opening in base A, with which engages a thumb-piece 26 on the upper end of the screw. The lower end of screw 25 passes through an opening in arm 22 between its ends, but near its pivot-point, and is threaded into a nut 27. The latter is bent upwardly at each side (see Fig. 3) to embrace the arm 22 and prevented from turning. A spring 28, coiled about screw 25 and between the base A and the arm 22, serves to take up all lost motion between the latter and nut 27. By turning thumb-piece 26 chin-rest C may be quickly shifted to any desired height. It will be noted that the chin-rest is raised by the positive lift of screw 25 upon arm 22, that the loose engagement of the latter with the lower end of rod 19 permits a right-line shift of the rod, and that the operating parts are hidden within the tubular standard $b$ and base A.

Upon an upwardly-extended portion 29 at the inner end of base A are formed longitudinal guides 30, upon which a slide D is mounted to reciprocate lengthwise of the instrument. A rack 31, fixed in central longitudinal position on the under side of slide D, extends between the guides 30, and its teeth are engaged by a pinion 32, centrally mounted upon a shaft 34 within an opening 33 in the base portion. The shaft is journaled within the base portion 29 and is provided with the end thumb-pieces 35, which engage opposite sides of the base portion to hold shaft 34 against longitudinal movement and by which pinion 32 may be rotated to move slide D back and forth.

A plug 36, brazed or otherwise fixed within the end of an upright tubular standard-section E, passes through an opening in slide D and is firmly threaded into a nut 37, held against rotation in a recess in the under side of the slide. A second tubular section E' is telescoped to slide within the section E, and within the upper end of section E' is journaled a pivot-piece $f$, carrying the supporting-arm F, which carries the light-screen, mirror, and lens-carriers.

A rack-section 38 is secured longitudinally to the inner face of tubular section E', and its teeth are engaged by those of a pinion 39, mounted upon the end of a shaft 40. The latter projects through a longitudinal slot 41 in section E' and is journaled within a bearing-sleeve 42, fixed at its inner end to the standard-section E over an opening therein. A thumb-piece 43 fits over the end of shaft 40, abuts against the sleeve 42, and is held in place by a screw 44, which passes through a central opening therein and is threaded into the end of the shaft. The end of shaft 40 and the bore of sleeve 42 are slightly and correspondingly tapered, (see Fig. 2,) and by means of screw 44 the shaft may be drawn snugly within the sleeve-bore, so that the inner standard-section E' and support F will be held in any of their adjusted positions by the friction developed in the bearing. A plate 45, fixed to the outer section E opposite the sleeve 42, has a square guide-block 46, which projects through an opening in the outer standard-section E into a vertical slot 47, cut in the inner section E', and serves to prevent any lateral twist of the latter and consequent cramping of the teeth of the rack and pinion. The standard-section E' may be thus quickly and conveniently adjusted to bring the support F opposite the eyes of the patient by operating parts hidden within the tubular standard.

Arm or support F is connected to pivot-piece $f$ by a hinge-joint (see Fig. 4) comprising a vertically-disposed circular head or hinge-section 48, which projects within a recess in the support and abuts against a similar hinge-section 49, preferably formed in piece with the support F. A headed pivot-bolt 50 extends through hinge-sections 48 and 49 and is snugly drawn to position by a headed screw 51, threaded into its end. Preferably the faces of the hinge-sections are recessed, as indicated, to permit free movement of the parts, the object being to make a snug joint, but one in which little friction is developed. An adjusting thumb-screw 52 (see Figs. 9 and 10) is threaded through a rearwardly-projecting horizontal arm 53 upon the upper end of pivot-piece $f$ and engages a plate 54, fixed to the under side of support F. Plate 54 is preferably slotted, as shown, and engages a groove formed in the upper end of screw 52. The latter preferably projects within a recess 55 in the support, and a coiled spring 56 in the recess engages a shoulder 57 on the screw and serves to take up the backlash between the latter and the support.

The arrangement of the light-screen and mirror is similar to that set forth in a prior application for patent filed by me on February 27, 1901, Serial No. 49,143. The light-screen G comprises a cylindrical body 58 of sheet metal or asbestos-board and a tubular shield 59, secured to cylinder 58 about a side opening therein. The cylinder is preferably provided with spring-clips 60 to support an incandescent or gas lamp or other suitable light-supply, and shield 59 may, if desired, serve to support a condensing-lens, diaphragm, and ground-glass window. An arm 61, pivoted at the inner end of the frame upon a bolt 62, carries the light-screen upon its outer end, which may thus swing from side to side within a looped or arc-shaped section 63 of the support as each eye is examined in turn in order that the eye not under examination may have a free unobstructed view directly forward. Stops 64, formed upon the frame-section 63, engage the end of supporting-arm 61 and limit the lateral shift of the light-screen.

An annular mirror-support 65, having a laterally-projecting stud or arm 66, is pivoted in upright position upon the upper end of the vertical bolt 62. Stud or arm 66 extends between a pair of oppositely-disposed stop-screws 67, threaded through upright ears 68 upon a cross-piece 69, fixed to the arm F. By this arrangement as the light-screen is shifted laterally from side to side the mirror-support will be shifted with it about the same pivot, but through a smaller arc, and will be arrested by stops 67 in such position that the mirror carried thereby will project the light-ray from the screen along the median line of support F to the patient's eye.

Within the annular support 65 (see Figs. 5 and 6) is rotatably mounted a socket or ring-frame 70 and is held therein by a pair of spring-clips 71, secured to the support 65 by wedges 72, and which project within an annular groove 73 upon the socket. A disk $h$ is carried upon a pair of diametrically-arranged pintles 74, one of which is extended, as shown, to form a handle 75, and a silvered mirror H is fixed to the face of the disk. The mirror-disk and mirror are provided with the usual central peep-hole 76, and the socket 70 has a view-opening 77 for the operator in line therewith. Light curved springs 78, fixed to the socket or ring-frame 70, bear upon the mirror-disk $h$ at diametrically opposite points and normally hold the latter in central position. By means of handle 75 the socket $h$ and the mirror carried thereby may be rotated within support 65 and the mirror tilted in all meridians, the particular one being indicated upon a scale 79, fixed to the face of support 65.

A mount for the retinoscopic and ophthalmoscopic attachments is provided at the forward end of frame F, preferably in the form of a transverse annular upright 80, carrying a horizontal tubular stub-socket 81, fixed thereto in any suitable manner, through which the light-ray from the mirror may be projected.

The attachment or lens-holder for refractive test of the eye (see Fig. 8) comprises a tubular member K, fixed at its inner end to an offset or abutment $k$, by which it may be carried in inclined position upon the supporting stub-socket 81. For this purpose the lower end of offset $k$ is provided with a companion stub-socket 82, adapted to snugly fit over the stub-socket 81, while a pin or stud 83 upon upright 80 engages a hole 84, formed in offset $k$, to hold the attachment in proper upright position.

A supporting-rod $l$ and hollow supporting-rod $l'$, sleeved together and mounted to rotate independently within the tubular frame member K, respectively carry at their outer ends the lens-disk L and the companion segmental lens-disk L'. The lens-disks L and L' are thus carried in adjacent relation near the patient's end of the instrument and are inclined slightly to the vertical. To protect the lenses from dust and dirt, the disks are preferably inclosed within a casing 85, mounted on the end of frame member K and having a removable front side or cover 86. Both casing 85 and cover 86 have oppositely-disposed openings 85' and 86', through which the light-ray is projected and in line with which the lenses of the disks L and L' may be successively brought and so placed before the patient's eye by rotating the disks. Convenient thumb-pieces or disks 87 and 88 are removably secured to the inner ends of the actuating-rods $l$ and $l'$. A scale is marked on the inner recessed face of the thumb-disk 88, (see Figs. 7 and 8,) while thumb-disk 87 carries a rearwardly-projected scale-disk 89, fitted within such recess and having openings 89', through which the figures on disk 88 may be seen. Plus and minus lenses 90, as in the construction set forth in the application above mentioned, are preferably provided in each lens-disk, so that any desired combination can be placed before the eye under examination; but in zero position, as shown in the drawings, the disks are provided with plain openings 91, through which the light-ray is projected.

When an open frame is used, as in this instance, it is desirable in order to procure clear definition of the so-called "luminous spot" in making the refractive eye-test to surround the eye by a dark pocket. This pocket is formed by an eyepiece 92, which is carried in a tubular support 93, conveniently formed on the cover-plate 86 opposite the openings 85' and 86' in the lens frame or casing. The support 93 projects laterally from cover-plate 86 at a slight angle to hold the eyepiece in horizontal position. The latter is preferably of such irregular outline as to fit snugly about the patient's eye and is telescoped within the support, thus being rotatably adjustable to fit about either eye and longitudinally adjustable, so that it may be brought close to the patient's face.

A conical shield 94, having a central opening, is fixed to the inner face of the lens-case 85, opposite the openings 85' and 86' therein, and within the shield is placed a lens-holder 95, into which may be inserted an additional lens 96 through an opening 97 at the bottom edge of shield 94.

Upon opposite ends of a cross-piece 98, (see Fig. 11,) fixed to the tubular support 93, are adjustably swiveled a pair of lens-holders 99, having circular spring-pieces 100 for supporting fogging-lenses before the free eye of the patient, so that the other eye may be dilated by sympathy therewith during examination.

The ophthalmoscopic attachment (see Fig. 12) comprises a convex object-lens M, mounted within a suitable tubular frame or sleeve 101, forming a stub-socket adapted to fit over the stub-socket 81 of the upright 80 on support F. A converging tubular shade 102 for the lens M is preferably provided, which may be lined with black cloth.

The retinoscopic and ophthalmoscopic attachments or lens-carriers are thus removably and interchangeably supported upon support F, so that either may be placed in line between the mirror and the head-rest B, and the light-screen and mirror may be utilized to project the light-ray through either attachment to the patient's eye. The use of two separate instruments is thus avoided and both refractive and ophthalmoscopic tests made in quick time.

The use of the instrument will be understood by those skilled in the art. For testing the refractive error the retinoscopic attachment or lens-holder is first placed in position. The patient's head is placed in stationary position on chin-rest C and against the open frame B. The frame F is adjusted to proper height and swung in a horizontal plane by means of a handle 103, fixed thereto at the operator's end for examination of either eye, the eyepiece 92 being adjusted to inclose the eye in a dark pocket. The light-screen and mirror may be swung from side to side in order that the free eye may have an unobstructed view straight ahead and fixed on some distant object, thus enlarging its pupil and by sympathy enlarging the pupil of the eye at the eyepiece. The light-screen and mirror are positioned by stops 64 and 67, so that the light-ray is invariably directed to the patient's eye. The mirror is tilted in all meridians, and the plane of astigmatism, if any exists, is indicated on the scale 79 and the test verified by placing a cylindrical lens of indicated strength and axis within the fixed lens-holder 95 in front of the patient's eye. In cases of ametropia the proper neutralizing-lens is found by manipulating the lens-disks L and L' to bring the proper lens or combination of lenses in front of the defective eye, and the result is indicated upon the scale-disks 88 and 89. The patient is placed by the instrument at a definite distance from the operator, and the lenses are corrected for this distance, no calculation being required. The indicating-scales may be seen by the operator through the central peep-hole of the mirror and accurate results quickly obtained. The slightly-inclined position of the lens-disks L and L' throws the annoying reflex from the cornea of the eye off of the operator's field of view and materially aids rapid accurate work.

For examination of the fundus of the eye the ophthalmoscopic attachment is placed in position. Frame F may be adjusted to proper height, may be swung in a horizontal plane upon the upper end of standard E E' for examination of either eye, and may be tilted in a vertical plane by adjusting thumb-screw 52 in order to throw the corneal reflex off of the field of view. The object-lens M is of such strength that by adjusting the frame F on standard E E' back and forth and by manipulating thumb-pieces 35 the reflected rays from the eye may be brought to a focus to form a well-defined inverted image of the fundus at the object-glass.

It is obvious that numerous changes may be made in the details of structure without departure from the essentials of the invention.

Having described my invention, what I claim as new, and desire to secure by Letters Patent, is—

1. In optical instruments, a suitable frame adapted at one end for the patient, a light-screen and a mirror having a peep-hole mounted at the opposite end, and means on said frame substantially midway between its ends and in the line of sight between said mirror and eyepiece for supporting an eyepiece and test-lens closely adjacent the patient's eye for refractive test and an object-glass midway between the ends of the instrument for ophthalmoscopic examination.

2. In optical instruments, a suitable frame having means at one end for positioning the patient's head, a light-screen and a mirror having a peep-hole mounted at the opposite end and a support substantially midway between the ends of the frame and in the line of sight between said mirror and eyepiece whereon may be interchangeably mounted suitable retinoscopic and ophthalmoscopic attachments.

3. In optical instruments, a suitable frame adapted at one end for the patient, a light-screen and a mirror having a peep-hole at the opposite end, a stub-socket on said frame substantially midway between the ends and in the line of sight between said mirror and eyepiece and a lens-carrier removably supported on the frame at said stub-socket.

4. In optical instruments, a frame having means at one end for positioning the patient's head, a light-screen and a mirror having a peep-hole at the opposite end, a horizontal tubular stub-socket on said frame substantially midway between its ends and in the line of sight between said mirror and eyepiece and a lens-carrier having a companion stub-socket removably carried on the frame thereby.

5. In optical instruments, a suitable base, means for positioning the patient's head mounted at one end of said base, a standard mounted at the opposite end, a horizontal support pivoted to swing upon the upper end of said standard, a light-screen and a mirror having a peep-hole carried on said support at its outer end, a stub-socket provided on said support midway between the ends of the instrument and a lens-carrier having a companion stub-socket removably carried thereby upon said frame.

6. In optical instruments, a frame comprising a suitable base having means at one end for positioning the patient's head, a supporting-arm mounted to swing in a horizontal plane at the opposite end, a light-screen and a mirror having a peep-hole mounted at the outer end of said supporting-arm, a stub-socket carried on said supporting-arm substantially midway between the ends of the instrument and a lens-carrier having a companion stub-socket removably carried thereby upon the frame.

7. In optical instruments, a frame having a head-rest at one end, a horizontally-disposed support at the opposite end, a light-screen and a mirror having a peep-hole mounted upon the outer end of said support, a horizontally-disposed stub-socket mounted upon said support substantially midway between said head-rest and said mirror and a lens-carrier having a companion stub-socket removably carried thereby upon the frame.

8. In optical instruments, a frame comprising a base having a standard at one end, a chin-rest carried thereby, a second standard at the opposite end of the base, a horizontally-disposed supporting-arm pivoted to the upper end of said supporting-standard, a light-screen and a mirror having a peep-hole mounted at the outer end of said supporting-arm, a stub-socket on said supporting-arm substantially midway between the ends of the instrument and a lens-carrier having a companion stub-socket removably carried thereby upon the frame.

9. In optical instruments, the combination with a suitable base having means at one end for positioning the patient's head, an adjusting-standard at the opposite end, an open, horizontally-disposed arm pivoted to the upper end of said adjusting-standard, a light-screen and a mirror having a peep-hole mounted upon the outer end of said supporting-arm, said light-screen and mirror being independently shiftable from side to side in a horizontal plane, a stub-socket upon the inner end of said arm and a lens-carrier having a companion stub-socket carried thereby upon the arm.

10. In optical instruments, a suitable base, a head-rest mounted thereon at one end, a supporting-standard at the opposite end, a support pivoted to swing in a horizontal plane upon the upper end of said second standard, a light-screen and a mirror having a peep-hole upon the outer end of said support, a stub-socket on said support substantially midway between said mirror and said head-rest and a lens-carrier having a companion stub-socket removably carried thereby upon said support and means for adjusting said support to and from said head-rest.

11. In optical instruments, the combination with a base having a head-rest at one end, a standard at the opposite end, a horizontally-disposed support pivoted to swing in a horizontal plane upon said standard, a light-screen and a mirror carried upon the outer end of said support, a stub-socket on said support, a lens-carrier having a companion stub-socket removably carried thereby upon the support and means for tilting said support in a vertical plane upon the upper end of said standard.

12. In optical instruments, a suitable base having a head-rest at one end, a supporting-standard at the opposite end, a horizontally-disposed support having a pivot-piece engaging said standard, a light-screen and a mirror mounted upon the outer end of said support, a stub-socket on said support substantially midway between said mirror and said head-rest, a lens-carrier having a companion stub-socket removably carried thereby upon said support, means for shifting said standard and parts carried thereby to and from said head-rest, means for vertically adjusting said standard and means for tilting said support and parts carried thereby in a vertical plane upon the upper end of said pivot-piece.

13. In optical instruments, a hollow base portion having a hollow upright standard at one end, a chin-rest projecting through a slot in the upper end of said hollow standard, a vertical supporting-rod for said chin-rest within said hollow standard and projecting downwardly within said hollow base portion, guides within said standard for said rod, a substantially horizontal shift-lever within said hollow base portion and pivoted at one end thereto with its free end loosely engaging the lower end of said supporting-rod, a vertically-disposed adjusting-screw extending loosely through said base portion and loosely through said shift-lever intermediate its ends, an external thumb-piece upon the upper end of said adjusting-screw, a nut threaded to the lower end of said adjusting-screw and engaging said shift-lever and a spring coiled about said adjusting-screw and interposed between said base portion and said shift-lever, substantially as described.

14. In optical instruments, the combination with a suitable base, a hollow standard at one end, an oval head-rest carried at its upper end, a chin-rest projecting through an opening in the side of said hollow standard near its upper end, a supporting-rod for said chin-rest mounted to slide vertically within said tubular standard, a shift-lever arranged to engage the lower end of said rod and a thumb-nut for adjusting said shift-lever.

15. In optical instruments, a suitable base having a head-rest at one end and a supporting-standard at the opposite end, a support having a light-screen, a mirror and a lens-carrier in opposed relation mounted upon said standard and means for adjusting said standard and parts carried thereby to and from said head-rest comprising a slide whereon said standard is mounted, guideways upon the base portion engaged by said slide, a rack upon the under side of said slide and a pinion journaled within a recess in said base portion engaging said rack.

16. In optical instruments, a suitable base portion having a head-rest at one end and a supporting-standard at the opposite end, a support carrying a light-screen, a mirror and a lens-carrier in opposed relation mounted upon the upper end of said standard, means for adjusting said standard and support to and from said head-rest comprising a dovetailed slide upon which said standard is mounted, dovetailed guideways upon said base for said slide, a rack fixed to the under side of said slide, a pinion mounted within a recess in said base and engaging said rack, a horizontal shaft extending through said base whereon said pinion is mounted and adjusting thumb-nuts secured to the end of said shaft.

17. In optical instruments, a suitable base portion, a support having a light-screen, mirror and lens-carrier in opposed relation, a standard for carrying said support upon said base portion, said standard comprising two tubular sections sleeved together one of which is shiftable longitudinally within the other, means for holding said shiftable section against lateral twist, a rack fixed to the inner face of said shiftable section, a pinion within said shiftable section engaging said rack, a stub-shaft extending through both of said tubular sections upon which said pinion is mounted, a sleeve wherein said shaft is journaled mounted upon said fixed section and an external adjusting thumb-nut secured to the outer end of said stub-shaft.

18. In optical instruments, a suitable base portion, a support having a light-screen, mirror and lens-carrier in opposed relation, a standard for carrying said support upon said base portion, said standard comprising inner and outer tubular sections sleeved together, a rack fixed to the inner face of said inner section, a pinion within said inner section engaging said rack, a stub-shaft whereon said pinion is mounted extending through a vertical slot in said inner section, a sleeve fixed to the outer section wherein said stub-shaft is journaled, a thumb-nut journaled upon the outer end of said shaft and a guide-piece fixed to the outer section engaging a longitudinal slot in the inner section.

19. In optical instruments, a suitable base portion, a support having a light-screen, mirror and lens-carrier in proper opposed relation, a standard for carrying said support upon said base portion, said standard comprising inner and outer sections sleeved together, a longitudinal rack fixed to the inner face of the inner section, a pinion engaging said rack, a horizontal stub-shaft whereon said pinion is mounted having a conical outer end, a sleeve having a corresponding conical bore within which said stub-shaft is journaled and an adjusting thumb-nut arranged to hold said stub-shaft snugly within the conical bore of said sleeve, whereby the inner section will be frictionally held in any one of its adjusted positions.

20. In optical instruments, a suitable base portion, a support having a light-screen, mirror and lens-carrier in proper opposed relation, a standard for carrying said support upon said base portion, said standard comprising inner and outer tubular sections sleeved together, a longitudinal rack fixed to the inner face of the inner section, a pinion engaging said rack, a horizontal stub-shaft for said pinion projecting through a slot in the inner section and having a conical outer end, a sleeve having a conical bore fixed to the outer section wherein said stub-shaft is journaled, an adjusting thumb-nut fitting the outer end of said shaft and engaging the outer end of said sleeve and a screw threaded through a central opening in said thumb-nut and into the outer end of said shaft for securely holding the latter within the conical bore of said sleeve.

21. In optical instruments, a suitable horizontally-disposed support, a light-screen, mirror and lens-carrier mounted on said support in opposed relation, a base portion and a standard for carrying said support upon said base portion, said standard comprising two tubular sections adjustably sleeved together, a pivot-piece fitted within the upper end of the inner standard-section and a hinge connection between said pivot-piece and said support, whereby the latter may swing in a horizontal plane and be tilted in a vertical plane.

22. In optical instruments, a horizontally-disposed support, a light-screen, mirror and lens-carrier mounted thereon in opposed relation, a standard for said support, a pivot-piece fitted within the upper end of said standard, a hinged connection between said pivot-piece and said support comprising abutting semicircular hinged sections and a connecting pivot-bolt, an arm fixed to the upper end of said pivot-piece and an adjusting-screw extending between the outer end of said arm and said support.

23. In optical instruments, a suitable base portion, a patient's head-rest mounted at one end thereof, an upright standard at the opposite end, a horizontally-disposed support swiveled upon the upper end of said standard to swing in a horizontal plane, a light-screen, mirror and lens-carrier mounted in opposed relation upon said support, means for adjusting said support vertically upon said standard and means for adjusting said support to and from said head-rest.

24. In optical instruments, a suitable base portion, a head-rest mounted at one end thereof, an upright standard at the opposite end, a pivot-piece swiveled in the upper end of said standard, a horizontally-disposed support hinged to said pivot-piece, a light-screen, mirror and lens-carrier mounted in opposed relation upon said suppport and means for adjusting said standard and support to and from said head-rest.

25. In optical instruments, a horizontally-disposed support having a light-screen and mirror mounted thereon at its outer end and a stub-socket at its inner end, a retinoscopic attachment comprising an abutment having a companion stub-socket removably carried thereby upon said support at its inner end, a substantially horizontal frame member fixed at its inner end to said abutment and a lens-carrier and patient's eyepiece carried at the outer end of said frame member.

26. In optical instruments, a suitable standard, a horizontally-disposed arm swiveled at the upper end of said standard, a light-screen and tilting mirror mounted to swing from side to side about a common center upon the outer end of said arm, an upright at its inner end, a horizontally-disposed tubular stub-socket fixed to said upright, a retinoscopic attachment comprising an abutment having a companion stub-socket removably carried thereby upon said arm, a substantially horizontal frame member fixed at its inner end to said abutment and a lens-carrier and patient's eyepiece mounted upon the outer end of said frame member.

27. In optical instruments, a suitable standard, a horizontal support upon the upper end of said standard having a light-screen and tilting mirror at its outer end and a stub-socket at its inner end, a retinoscopic attachment comprising an abutment having a companion stub-socket removably carried thereby upon said support, a horizontally-disposed tubular member fixed at its inner end to said abutment, a lens-casing and eyepiece mounted upon the outer end of said frame member, a lens-disk within said casing, an operating-rod therefor sleeved within said tubular frame member and an external adjusting-nut fixed to the inner end of said supporting-rod.

28. In optical instruments, a suitable standard, a horizontally-disposed arm swiveled to the upper end of said standard, a light-screen and tilting mirror carried upon the outer end of said arm, an upright having a horizontally-disposed stub-socket upon the inner end of the arm, a retinoscopic attachment comprising an abutment having a companion stub-socket removably carried thereby upon the arm, a tubular frame member inclined to the horizontal and fixed at its inner end to said abutment, a lens-casing inclined to the vertical and fixed to the outer end of said tubular frame member, a patient's eyepiece carried upon said lens-casing, a lens-disk within said casing, an operating-rod for said lens-disk sleeved within said tubular frame member and an adjusting-nut fixed to the inner end of said rod.

29. In optical instruments, a suitable standard, a horizontally-disposed arm swiveled to the upper end of said standard having a light-screen and tilting mirror mounted in opposed relation upon its outer end and a stub-socket at its inner end, a retinoscopic attachment comprising an abutment having a companion stub-socket removably carried thereby upon said arm, a substantially horizontal frame member fixed at its inner end to said abutment, a cylindrical lens-casing mounted upon the outer end of said frame member, an eyepiece carried upon said lens-casing near its periphery, companion lens-disks mounted in adjacent relation in said casing, operating-rods therefor sleeved together and sleeved within said tubular frame member and actuating thumb-nuts fixed to the inner ends of said rods.

30. In optical instruments, a suitable standard, a horizontally-disposed supporting-arm fixed to the upper end of said standard having a light-screen and tilted mirror mounted in opposed relation at its outer end and a stub-socket at its inner end, a retinoscopic attachment comprising an abutment having a companion stub-socket removably carried thereby upon said arm, a substantially horizontal frame member fixed at its inner end to said abutment, a lens-casing upon the outer end of said frame member, a patient's eyepiece carried on the outer side of said lens-casing, a hood fixed to the inner face of said lens-casing opposite said eyepiece and a lens-holder within said hood.

31. In optical instruments, a suitable frame or support, a light-screen and tilting mirror mounted in opposed relation at one end, an eyepiece at the opposite end, companion lens-disks mounted in adjacent relation in front of said eyepiece, operating-rods therefor sleeved together and extending inwardly toward said mirror and a pair of scale-disks fixed in adjacent relation to the inner ends of said rods, the outer scale-disk having openings through which the figures upon the inner disk may be viewed.

32. In optical instruments, a suitable frame or support, a light-screen and tilting mirror mounted at one end thereof, a tubular support at its opposite end and a patient's eyepiece fitted telescopically within said tubular support whereby it may be rotatably and longitudinally adjusted, said eyepiece being of such an irregular outline as to fit securely about either eye of the patient.

SETH A. RHODES.

Witnesses:
HARRY L. CLAPP,
ALBERTA ADAMICK.